US006474265B1

(12) United States Patent
Powell

(10) Patent No.: US 6,474,265 B1
(45) Date of Patent: Nov. 5, 2002

(54) ADJUSTABLE AQUARIUM DIVIDER

(76) Inventor: William P. Powell, 321 W. Jamison Pl. #14, Littleton, CO (US) 80120

( * ) Notice: Subject to any disclaimer, the term of this patent is extended or adjusted under 35 U.S.C. 154(b) by 0 days.

(21) Appl. No.: 09/881,890

(22) Filed: Jun. 15, 2001

(51) Int. Cl.[7] .............................................. A01K 63/00
(52) U.S. Cl. ...................... 119/248; 119/219; 119/245; 4/514
(58) Field of Search ................. 119/248, 219, 119/224, 225, 245, 247, 253, 257, 523; 4/514

(56) References Cited

U.S. PATENT DOCUMENTS

| | | | | |
|---|---|---|---|---|
| 668,322 A | * | 2/1901 | Stephen ........................ 119/61 |
| 1,196,444 A | * | 8/1916 | Ellis ............................ 160/225 |
| 3,255,731 A | * | 6/1966 | Girard ........................ 119/224 |
| 3,288,110 A | * | 11/1966 | Goldman et al. ............ 119/248 |
| 3,304,912 A | | 2/1967 | Hackman et al. |
| 3,374,770 A | * | 3/1968 | Freudenberger ............. 119/252 |
| 3,512,503 A | | 5/1970 | Willinger |
| 4,029,050 A | * | 6/1977 | Genest ........................... 119/5 |
| 4,120,265 A | | 10/1978 | Davis |
| 4,323,032 A | * | 4/1982 | Halfon ........................ 119/248 |
| 5,144,908 A | | 9/1992 | Tominaga |
| D368,556 S | | 4/1996 | Rodgers |
| 5,640,929 A | * | 6/1997 | Malone ........................ 119/248 |
| 5,664,371 A | * | 9/1997 | Berliner ........................ 160/351 |
| 5,690,053 A | * | 11/1997 | Strange, Jr. ................. 119/248 |
| 5,771,505 A | * | 6/1998 | Reynolds ..................... 160/222 |

FOREIGN PATENT DOCUMENTS

JP       405123079   *   5/1993   ......... A01K/63/00

* cited by examiner

Primary Examiner—Peter M. Poon
Assistant Examiner—Andrea Valenti

(57) ABSTRACT

An adjustable aquarium divider for dividing an aquarium into separate sections while allowing water flow between the sections. The adjustable aquarium divider includes a first panel and a second panel. Each of the panels is rigid and has a first side and second side. Each of the panels has a generally rectangular shape. The panels each have a plurality of apertures therein extending through first and second sides. A fastening member removably fastens the first panel to the second panel such that the first and second panels are partially overlapping and a wall is defined. The first and second panels have aligned upper and lower edges. The wall has a pair of lateral side edges. The panels are positioned in an aquarium such that each of the lateral side edges is abutting one of a pair of opposite walls in the aquarium.

6 Claims, 3 Drawing Sheets

ADJUSTABLE AQUARIUM DIVIDER

BACKGROUND OF THE INVENTION

1. Field of the Invention

The present invention relates to aquarium dividing devices and more particularly pertains to a new adjustable aquarium divider for dividing an aquarium into separate sections while allowing water flow between the sections.

2. Description of the Prior Art

The use of aquarium dividing devices is known in the prior art. More specifically, aquarium dividing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,120,265; 3,288,110; 3,304,912; 3,512,503; 5,144,908; U.S. Pat. No. Des. 368,556.

While these devices fulfill their respective, particular objectives and requirements, the aforementioned patents do not disclose a new adjustable aquarium divider. The inventive device includes a first panel and a second panel. Each of the panels is rigid and has a first side and second side. Each of the panels has a generally rectangular shape. The panels each have a plurality of apertures therein extending through first and second sides. A fastening member removably fastens the first panel to the second panel such that the first and second panels are partially overlapping and a wall is defined. The first and second panels have aligned upper and lower edges. The wall has a pair of lateral side edges. The panels are positioned in an aquarium such that each of the lateral side edges is abutting one of a pair of opposite walls in the aquarium.

In these respects, the adjustable aquarium divider according to the present invention substantially departs from the conventional concepts and designs of the prior art, and in so doing provides an apparatus primarily developed for the purpose of dividing an aquarium into separate sections while allowing water flow between the sections.

SUMMARY OF THE INVENTION

In view of the foregoing disadvantages inherent in the known types of aquarium dividing devices now present in the prior art, the present invention provides a new adjustable aquarium divider construction wherein the same can be utilized for dividing an aquarium into separate sections while allowing water flow between the sections.

The general purpose of the present invention, which will be described subsequently in greater detail, is to provide a new adjustable aquarium divider apparatus and method which has many of the advantages of the aquarium dividing devices mentioned heretofore and many novel features that result in a new adjustable aquarium divider which is not anticipated, rendered obvious, suggested, or even implied by any of the prior art aquarium dividing devices, either alone or in any combination thereof.

To attain this, the present invention generally comprises a first panel and a second panel. Each of the panels is rigid and has a first side and second side. Each of the panels has a generally rectangular shape. The panels each have a plurality of apertures therein extending through first and second sides. A fastening member removably fastens the first panel to the second panel such that the first and second panels are partially overlapping and a wall is defined. The first and second panels have aligned upper and lower edges. The wall has a pair of lateral side edges. The panels are positioned in an aquarium such that each of the lateral side edges is abutting one of a pair of opposite walls in the aquarium.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable aquarium divider apparatus and method which has many of the advantages of the aquarium dividing devices mentioned heretofore and many novel features that result in a new adjustable aquarium divider which is not anticipated, rendered obvious, suggested, or even implied by any of the prior art aquarium dividing devices, either alone or in any combination thereof.

It is another object of the present invention to provide a new adjustable aquarium divider which may be easily and efficiently manufactured and marketed.

It is a further object of the present invention to provide a new adjustable aquarium divider which is of a durable and reliable construction.

An even further object of the present invention is to provide a new adjustable aquarium divider which is susceptible of a low cost of manufacture with regard to both materials and labor, and which accordingly is then susceptible of low prices of sale to the consuming public, thereby making such adjustable aquarium divider economically available to the buying public.

Still yet another object of the present invention is to provide a new adjustable aquarium divider which provides in the apparatuses and methods of the prior art some of the advantages thereof, while simultaneously overcoming some of the disadvantages normally associated therewith.

Still another object of the present invention is to provide a new adjustable aquarium divider for dividing an aquarium into separate sections while allowing water flow between the sections.

Yet another object of the present invention is to provide a new adjustable aquarium divider which includes a first panel and a second panel. Each of the panels is rigid and has a first side and second side. Each of the panels has a generally rectangular shape. The panels each have a plurality of apertures therein extending through first and second sides. A fastening member removably fastens the first panel to the second panel such that the first and second panels are partially overlapping and a wall is defined. The first and second panels have aligned upper and lower edges. The wall has a pair of lateral side edges. The panels are positioned in an aquarium such that each of the lateral side edges is abutting one of a pair of opposite walls in the aquarium.

Still yet another object of the present invention is to provide a new adjustable aquarium divider that has an adjustable width such that the device is retrofittable for various aquariums.

Even still another object of the present invention is to provide a new adjustable aquarium divider that has apertures extending therethrough for permitting water flow through the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
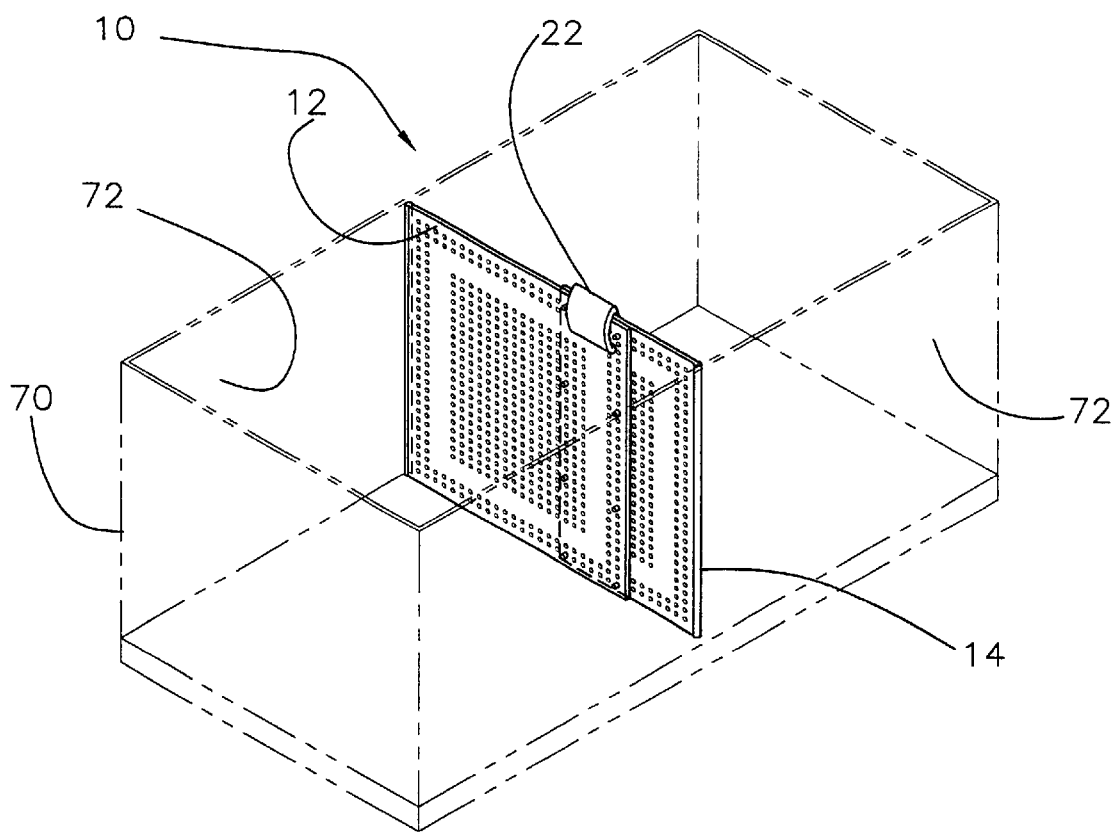
FIG. 1 is a schematic perspective view of a new adjustable aquarium divider according to the present invention.
Figure 2:
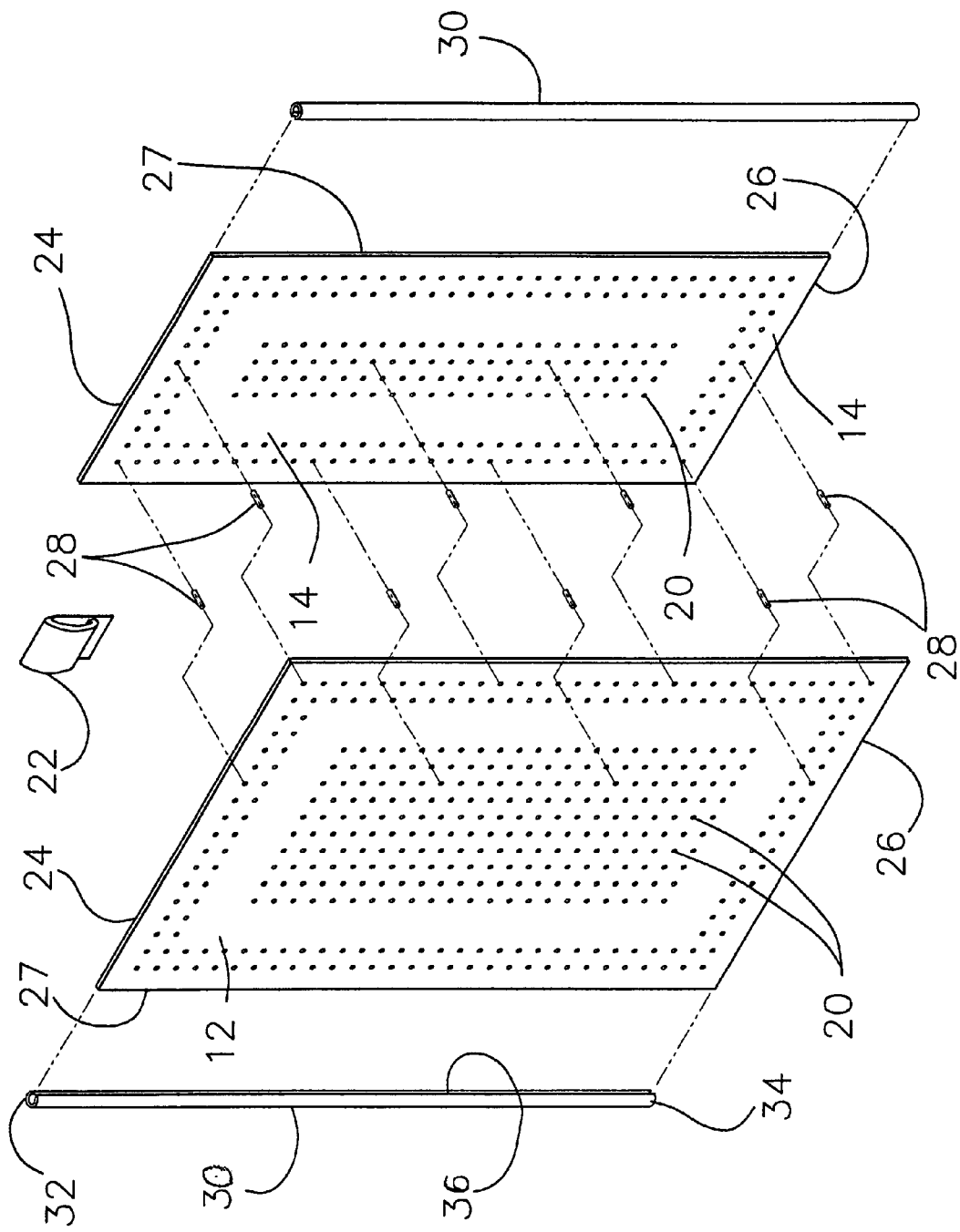
FIG. 2 is a schematic perspective view of the present invention.
Figure 3:
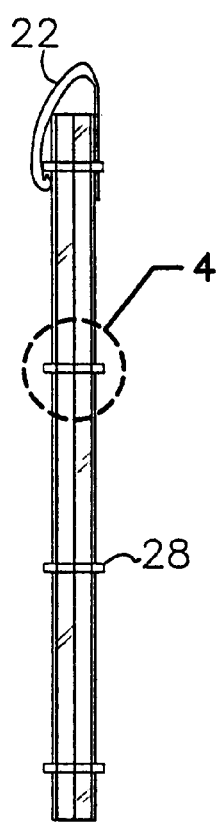
FIG. 3 is a schematic side view of the present invention.
Figure 4:
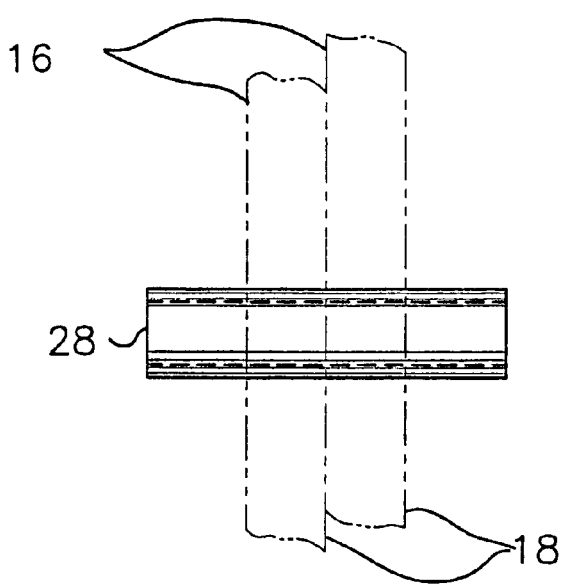
FIG. 4 is a schematic side view of the present invention.

With reference now to the drawings, and in particular to FIGS. 1 through 4 thereof, a new adjustable aquarium divider embodying the principles and concepts of the present invention and generally designated by the reference numeral 10 will be described.

As best illustrated in FIGS. 1 through 4, the adjustable aquarium divider 10 generally comprises a device for positioning in an aquarium 70 and extending between a pair of opposite walls 72 of the aquarium 70. The device 10 comprises a first panel 12 and a second panel 14. Each of the panels 12, 14 is rigid and has a first side 16 and second side 18. Each of the panels 12, 14 has a generally rectangular shape. The panels 12, 14 each have a plurality of apertures 20 therein extending through first 16 and second 18 sides. Preferably, each of the panels 12, 14 comprises a plastic material.

A fastening member 22 removably fastens the first panel 12 to the second panel 14 such that the first 12 and second 14 panels are partially overlapping and a wall is defined. The first 12 and second 14 panels have aligned upper 24 and lower 26 edges when they are fastened together. The wall has a pair of lateral side edges 27. The fastening member 22 comprises a clip extending over adjacent upper edges 24 and holding the first panel 12 against the second panel 14.

A plurality of securing members 28 removably secure the first panel 12 to the second panel 14 such that wall defined by the abutting panels is more stable. The securing members 28 comprise a plurality of rods selectively extending through aligned apertures in the first 12 and second 14 panels.

Each of a pair of support members 30 comprises an elongated tubular member having a first end 32 and a second end 34. Each of tubular members has a slot 36 therein extending between and through the first 32 and second 34 ends. Each of the lateral side edges 27 is positionable in one of the slots 36 such that the support members 30 extend between the upper 24 and lower 26 edges. The support members 30 preferably comprise an elastomeric material.

In use, the width of the aquarium 70 between opposite walls 72 is ascertained. The panels 12, 14 are fastened together such that the width of the wall defined by the panels generally equals the width of the aquarium 70. The panels 12, 14 are then positioned in the aquarium 70 such that each of the support members 30 is abutting one of the pair of opposite walls 72. The support members 30 frictionally engage the walls 72 of the aquarium. Rocks and other material within the aquarium 70 may also be used to stabilize the panels 12, 14 in a generally vertical orientation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable aquarium dividing device for positioning in an aquarium and extending between a pair of opposite walls of the aquarium, said device comprising:

a first panel and a second panel, each of said panels being rigid, each of said panels having a first side and second side, each of said panels having a generally rectangular shape, each of said panels having a plurality of apertures therein extending through first and second sides;

a fastening member for removably fastening said first panel to said second panel such that said first and second panels are partially overlapping and a wall is defined, said first and second panels having aligned upper and lower edges, said wall having a pair of lateral side edges;

wherein said panels are positioned in the aquarium such that each of said lateral side edges is abutting one of the pair of opposite walls; and a plurality of securing members for removably securing said first panel to said second panel, said securing members comprising a plurality of rods extending through aligned apertures in said first and second panels.

2. The adjustable aquarium dividing device as in claim 1, wherein said fastening member comprises a clip extending over adjacent upper edges and holding said first panel against said second panel.

3. The adjustable aquarium dividing device as in claim 1, further including a plurality of securing members for removably securing said first panel to said second panel, said securing members comprising a plurality of rods extending through aligned apertures in said first and second panels.

4. The adjustable aquarium dividing device as in claim 1, further including a pair of support members, each of said support members comprising an elongated tubular member having a first end and a second end, each of tubular members having a slot therein extending between and through said first and second ends, each of said lateral side edges being positionable in one of said slots such that said support members extend between said upper and lower edges, said support members being positioned between said panels and the walls of the aquarium.

5. The adjustable aquarium dividing device as in claim 4, wherein each of said support members comprises an elastomeric material.

6. An adjustable aquarium dividing device for positioning in an aquarium and extending between a pair of opposite walls of the aquarium, said device comprising:

a first panel and a second panel, each of said panels being rigid, each of said panels having a first side and second side, each of said panels having a generally rectangular shape, each of said panels having a plurality of apertures therein extending through first and second sides, each of said panels comprising a plastic material;

a fastening member for removably fastening said first panel to said second panel such that said first and second panels are partially overlapping and a wall is defined, said first and second panels having aligned upper and lower edges, said wall having a pair of lateral side edges, said fastening member comprising a clip extending over adjacent upper edges and holding said first panel against said second panel;

a plurality of securing members for removably securing said first panel to said second panel, said securing members comprising a plurality of rods extending through aligned apertures in said first and second panels;

a pair of support members, each of said support members comprising an elongated tubular member having a first end and a second end, each of tubular members having a slot therein extending between and through said first and second ends, each of said lateral side edges being positionable in one of said slots such that said support members extend between said upper and lower edges, each of said support members comprising an elastomeric material; and wherein said panels are positioned in the aquarium such that each of said support members is abutting one of the pair of opposite walls.

* * * * *